(12) United States Patent
Ooami

(10) Patent No.: US 7,872,704 B2
(45) Date of Patent: Jan. 18, 2011

(54) FLAT-PANEL DISPLAY DEVICE AND ITS MANUFACTURING METHOD

(75) Inventor: Yukio Ooami, Hyogo (JP)

(73) Assignee: Toshiba Matsushita Display Technology Co., Ltd., Tokyo (JP)

(*) Notice: Subject to any disclaimer, the term of this patent is extended or adjusted under 35 U.S.C. 154(b) by 158 days.

(21) Appl. No.: 12/327,884

(22) Filed: Dec. 4, 2008

(65) Prior Publication Data

US 2009/0153768 A1    Jun. 18, 2009

(30) Foreign Application Priority Data

Dec. 18, 2007 (JP) .............................. 2007-325807

(51) Int. Cl.
*G02F 1/1333* (2006.01)
(52) U.S. Cl. .......................................... 349/58; 349/60
(58) Field of Classification Search ................... 349/12, 349/58, 60, 160, 173, 187
See application file for complete search history.

(56) References Cited

U.S. PATENT DOCUMENTS

| | | | |
|---|---|---|---|
| 5,406,399 A * | 4/1995 | Koike ........................... | 349/58 |
| 6,177,971 B1 * | 1/2001 | Jung et al. ..................... | 349/60 |
| 6,734,928 B2 * | 5/2004 | Ito et al. ........................ | 349/58 |
| 6,864,929 B2 * | 3/2005 | Wang ............................ | 349/58 |
| 7,315,336 B2 * | 1/2008 | North et al. ................... | 349/58 |
| 2005/0285990 A1 * | 12/2005 | Havelka et al. ............... | 349/58 |
| 2008/0218660 A1 * | 9/2008 | Suzuki ......................... | 349/65 |

FOREIGN PATENT DOCUMENTS

| | | |
|---|---|---|
| JP | 6-141259 | 5/1994 |
| JP | 2006-163742 | 6/2006 |
| JP | 2007-156491 | 6/2007 |

* cited by examiner

*Primary Examiner*—Akm E Ullah
(74) *Attorney, Agent, or Firm*—Finnegan, Henderson, Farabow, Garrett & Dunner, L.L.P.

(57) ABSTRACT

A flat-panel display device comprises a display panel, a main surface of which is substantially a viewing area; a bezel cover formed of a metal frame, which covers a fringe part of the display panel; a touchscreen panel that is arranged to cover the viewing area of the display panel so that the bezel cover is sandwiched between the fringe part of the display panel and a fringe part of the touchscreen panel; and an outsert-molded resin part that is formed integrally on said metal frame, by outsert molding with a black resin material, and covers an inner fringe of said metal frame as well as its vicinity on a surface facing the touchscreen panel.

8 Claims, 2 Drawing Sheets

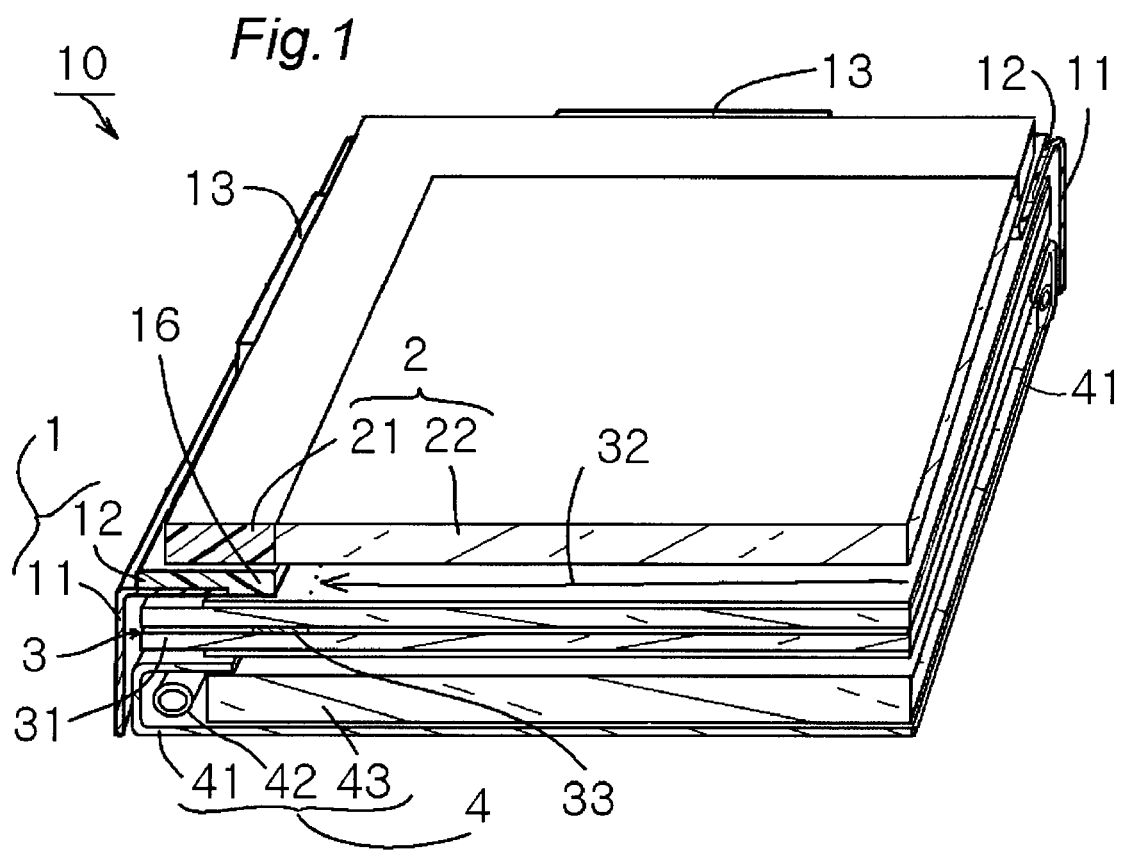
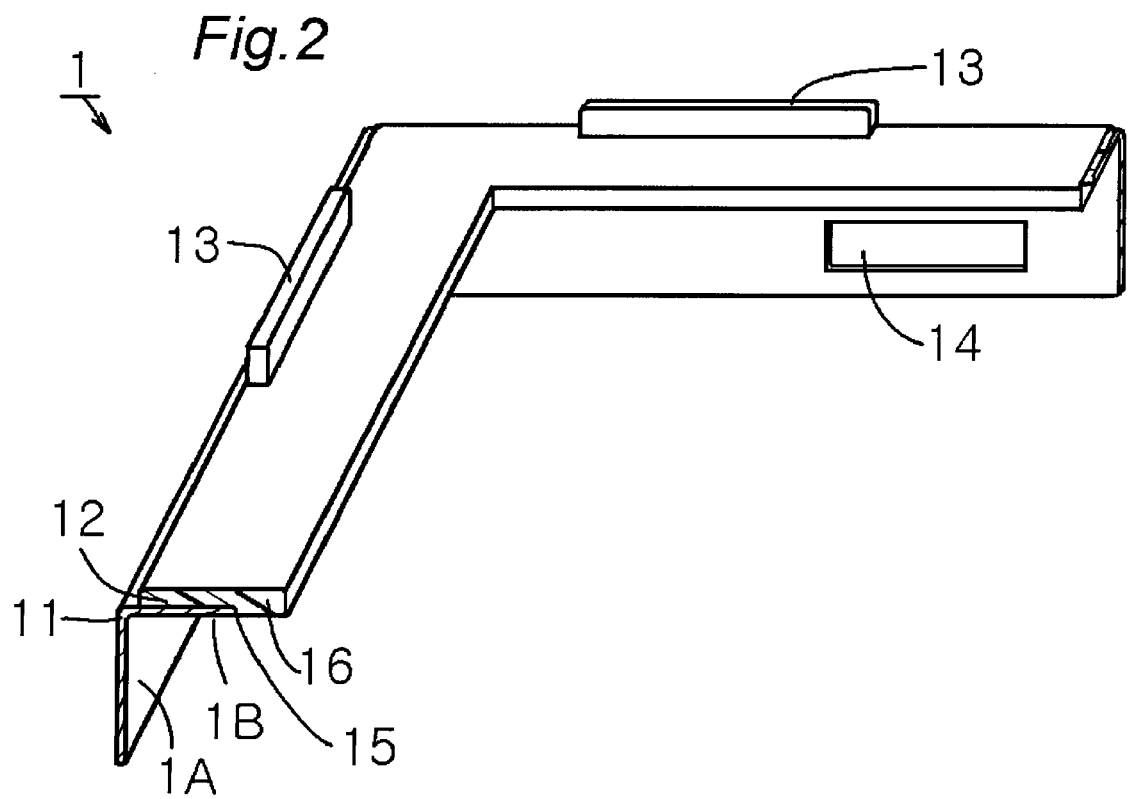

FLAT-PANEL DISPLAY DEVICE AND ITS MANUFACTURING METHOD

CROSS-REFERENCE TO RELATED APPLICATION

This application is based upon and claims the benefit of priority from the prior Japanese Patent Application No. 2007-325807, filed on Dec. 18, 2007; the entire contents of which are incorporated herein by reference.

FIELD OF THE INVENTION

This invention relates to a flat-panel display device attached with a touchscreen panel for input operation, on a display face of a display panel in a liquid-crystal display (LCD) device or in a some other flat-panel display device. The invention also relates to manufacturing method of such flat-panel display device.

DESCRIPTION OF THE BACKGROUND

The display devices having touchscreen panels are mounted on personal computers, personal digital assistants (PDAs), various vendor machines, and communication terminal equipments. The touchscreen panel enables input operation at right on a viewing area by producing output signals in response to touching with finger tip or pen tip. The touchscreen panels have become increasingly widely used because they are convenient for every user who easily makes inputting operation at a same time of watching image on the viewing area or display screen, and because they eliminates need of keyboard and mouse devices. The display device having touchscreen panel is generally constructed by attaching the touchscreen panel on an obverse or display face of a display panel. The display panel having a diagonal dimension of the viewing area at 5 inch or more is generally equipped with a "picture-frame-shaped" frame element that covers and is attached on a whole fringe of the display panel. This frame element is called as a bezel cover and generally has an L-shaped cross section consisting of; a wall covering edge faces of the display panel and arranged in a direction of thickness of the display panel; and an inward flange covering fringe portions of display face of the display panel. When the touch panel is brought and attached on the display face of the display panel, fringe part of the touch panel is superimposed on fringe part of the display panel as to sandwich the inward flange of the bezel cover. Please see JP-2006-163742A (Japan's patent application publication No. 2006-163742) and JP-2007-156491A (Japan's patent application publication No. 2007-156491) for example. The bezel cover is generally formed of a metal or a metal alloy and also serves as an electromagnetic shield casing.

Meanwhile, JP-1994(H06)-141259A proposes that a black printed pattern for delustering is provided as to encircle its viewing area, on a casing frame of a liquid crystal display (LCD) device that is wearable in a way of eyeglasses. While outside light comes through a gap between an inward face of the casing frame and face skin of the user, the black printed pattern curbs reflecting of the outside light at the inward face on the casing frame. Resultantly, it is achieved a clear and sharp presentation of video images for the user.

SUMMARY OF THE INVENTION

A flat-panel display device of the invention comprises; a display panel, a main surface of which is substantially a viewing area; a bezel cover formed of a metal frame, which covers a fringe part of the display panel; a touchscreen panel that is arranged to cover the viewing area of the display panel so that the bezel cover is sandwiched between the fringe part of the display panel and a fringe part of the touchscreen panel; and an outsert-molded resin part that is formed integrally on said metal frame, by outsert molding with a black resin material, and covers an inner fringe of said metal frame as well as its vicinity on a surface facing the touchscreen panel.

A manufacturing method of the invention, of the flat-panel display device that is comprised of; a display panel, a main surface of which is substantially a viewing area; a bezel cover formed of a metal frame, which covers fringe part of the display panel; and a touchscreen panel that is arranged to cover the viewing area of the display panel so that the bezel cover is sandwiched between a fringe part of the display panel and a fringe part of the touchscreen panel; comprises: forming said metal frame by a metal-sheet working, from a metal sheet having no resin coating layer; and an outsert molding, in which said metal frame is positioned in a forming tool and then a black resin material in a molten state is poured into the forming tool so as to form a black resin part that covers at least an inner fringe of said metal frame as well as its vicinity on a surface facing the touchscreen panel.

By such construction, glaring is curbed to improve display quality while minimizing production cost and improving percentage of shippable products.

BRIEF DESCRIPTION OF THE DRAWINGS

FIG. 1 is a cross sectional view showing a multi-layer construction of an LCD device as an embodiment of the invention;

FIG. 2 is a perspective view showing a bezel cover or a shield casing as an essential portion of the LCD device of FIG. 1;

DETAILED DESCRIPTION OF THE INVENTION

It has been found that some glaring is occasionally occurred in conventional LCD devices having the touchscreen panels when viewed from a certain view angle and/or used in a certain condition as to deteriorate a display performance of the LCD devices. The glaring is found to be caused by reflecting of light not on outer faces but on inner faces of the outer casing frame as to be perceived by the user; if and when the LCD devices are used under fierce sunlight at outdoor, and if and when the user stares obliquely the screen surface and lighting in a room is positioned to direct a light reflected on the screen surface in a direction toward eyes of the user. Cause of the glaring is investigated and it is thereby revealed that inner fringe of the bezel cover glitters and such glittering is seen through the touchscreen panel. Thus, to curb the glittering, a metal sheet forming the bezel cover was coated with black color paint on before hand of assembling the LCD device. Resultantly, the glaring was curbed.

Such coating of the bezel cover with the black color paint induces not only increase of total production cost by adding cost of the coating but also following problems. Uneven distribution of the coating may be occurred in a coating process; and scratch or pinhole may be formed on a coating film due to adhering of a minute foreign particle or the like at a time of the coating. Thus, percentage of shippable or non-defective bezel covers among whole of produced ones is deteriorated as to increase production cost of the bezel covers. Moreover, some error in handling the bezel cover may also cause the scratch on the coating and thus induce further deterioration of the percentage of shippable goods.

In view of the above problems, it is aimed to curb glaring at surrounding of the viewing area and thereby improve display quality while minimizing production cost and improving percentage of shippable or non-defective products.

Figure 3:
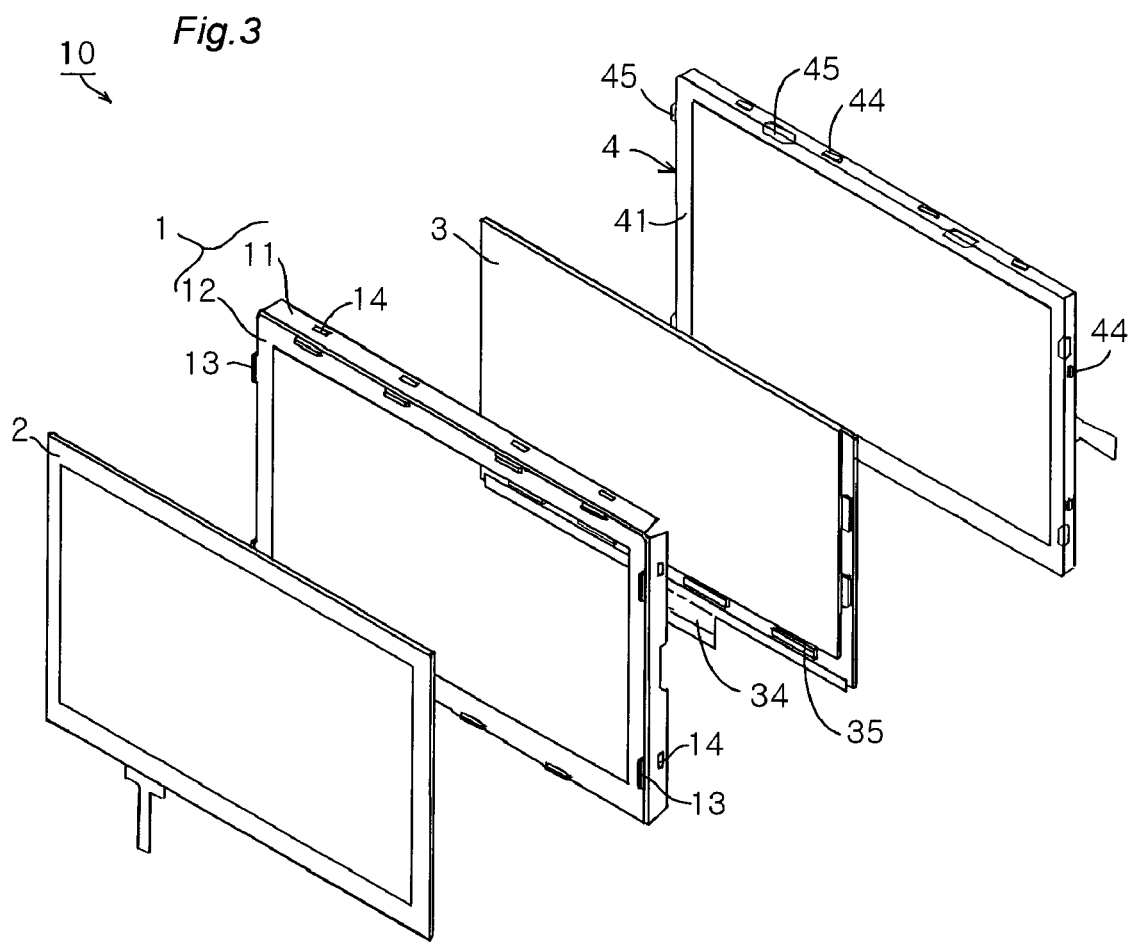
FIG. 3 is an exploded perspective view of the LCD device of FIG. 1.

An LCD device and its manufacturing method according to an embodiment of the invention are explained by use of FIGS. 1-3. FIG. 1 shows a multi-layer construction of the LCD device; FIG. 2 shows a bezel cover as an essential part of the LCD device; and FIG. 3 shows an exploded perspective view of the LCD device. The LCD device of the embodiment is, in a detailed example, that for a navigation device of automobiles and achieves image displaying at a relatively high definition. The LCD device in the detailed example is an active matrix display device, which has a TFT (thin film transistor) as a switching element on each pixel dot, and in which On-state pixel dots are electrically separated from Off-state pixel dots and video signals supplied to the On-state pixel dots are kept for awhile. In an illustrated example, the LCD device 10 has a backlight and is thus a light transmissive one or a semi-transmissive one. And, as shown in FIG. 3, the LCD device 10 has a wide-screen viewing area having a diagonal dimension of 7 inch for example and having an aspect ratio or length-to-width dimension ratio at about 2/1.

A backlight unit 4 is comprised of; a metal casing 41 shaped as a rectangular tray, as well as, a lamp 42 and a light-guide plate 43 that are of a backlight mechanism and are accommodated in the metal casing 41. A light-emitting face of the backlight unit 4 is overlaid with an LCD panel 3, and then capped by a bezel cover 1 so that whole fringe parts of the LCD panel 3 and the backlight unit are covered by the bezel cover 1. The bezel cover 1 is a rectangular frame, each portion of which has an L-shaped cross section, and is comprised of; a wall 1A extending in a thickness direction as to encircle edge faces of the LCD panel 3 and the backlight unit 4; and an inward flange 1B protruding to inward from an end of the wall 1A, along obverse or display face of the LCD panel. A touch-screen panel 2 is further superimposed on the bezel cover 1 in a manner that the inward flange 1B of the bezel cover 1 is sandwiched between fringe part 31 of the LCD panel 3 and fringe part 21 of the touchscreen panel 2. The fringe part 31 of the LCD panel 3 encircles a viewing area 32 of the LCD panel 3 and is adjoined with the viewing area 32 from outside. The fringe part 31 has a solid pattern of light-shielding film 33, which runs along periphery of the viewing area 32, at an inner face on either of two transparent substrates forming the LCD panel 3. Thus, the viewing area 32 is an area encircled by inner fringe of the solid pattern of light-shielding film 33. The fringe part 21 of the touchscreen panel 2 is an area encircling a transparent switch array 22 of the touchscreen panel 2 and adjoined with the transparent switch array 22 from outside, and serves as a kind of frame part by being formed of an opaque resin or a metal.

The bezel cover 1 is comprised of; a metal frame 11 that is formed by a sheet-metal working of a metal sheet; and a black-colored outsert-molded resin part 12 that covers and is attached on obverse surface of the metal frame 1, at a distal part of the inward flange 1B. The outsert-molded resin part 12 is formed by use of a resin compound, which is a mixture of base resin(s), fillers and/or additives and is colored by some black pigments. Outsert molding is in same manner with insert molding and for forming a resin part integral with a metal element; and, in both molding, the metal element is placed as fixed in a forming tool and then a molten resin material is poured, injected or introduced into the forming tool. The outsert molding differs from an ordinary insert molding only in that a molded resin part having a dimension smaller than that of the metal element is formed.

As seen from FIGS. 1-2, an inner-fringe part 16 of the black outsert-molded resin part 12 covers up the inner fringe 15 of the metal frame 11. In other words, an edge face on the inward fringe 16 is completely covered by the black resin. Therefore, the inner-fringe part 16 of the black outsert-molded resin part 12 is apparently fitted into the inward fringe 16 in a rectangular shape, of the metal frame 11. In an illustrated example, the inner-fringe part 15 protrudes to inward than the inner fringe 15 to form a kind of resin flange, by a dimension of 0.5-4 mm for example; preferably by 1-3 mm and by a 2 mm in a detailed example. In this way, the outsert-molded resin part 12 covers up the inward fringe 16, its edge face in particular, of the metal frame 11. The outsert-molded resin part 12 also covers up obverse face of the metal frame 11, at least in vicinity of the inner fringe 15. Resultantly, metal face would never show up on the display face at around the viewing area; even when seen from any large view angle and in any direction, through the transparent switch array 22 of the touchscreen panel 2; and even with incidence of outside light from any incidence angle and in any direction. Thus, display quality is never damaged by light reflected on a metal face of the metal frame 11. In the illustrated example, outside light might leak through an obverse-side substrate (counter substrate or color-filter substrate) of the LCD panel 2 and might penetrate into an area covered by the inward flange 1B of the bezel cover 1. Even in such an occasion, the outside light never reaches the metal frame 11 because the inner-fringe part 16 of the outsert-molded resin part 12 protrudes to form a resin flange.

The resin compound used for the outsert molding may be as follows for example. Polycarbonate (PC) resin having high impact strength is added with carbon black having electro-conductivity, by 5-20 wt %. Carbon black content in such mixture maybe 10 wt % for example. As a Polycarbonate (PC) base resin, one among resins of "IM400" series of Sumitomo Dow Limited may be adopted for example. As a species of conductive carbon black, "KetchenBlack EC300J" available from Akzo Nobel Polymer Chemicals LLC or Lion Chemical Co., Ltd. may be adopted for example. When such a conductive resin compound is used for the outsert-molding, electromagnetic shielding performance will be somewhat improved. By adopting an engineering plastic added with fillers, rigidity and toughness of the bezel cover 1 would be improved. Moreover, the outsert-molded resin part 12 serves as a cushioning layer at some extent, and improves impact strength of the LCD device at a time the LCD device is dropped down on the floor or the ground or collided with something. When high-impact strength is not required according to usage of the LCD device, polypropylene (PP) resin, Polyethylene (PE) resin or other general-purpose resins with cheaper prices may be used in place of the engineering plastic such as polycarbonate resin. Meanwhile, an elastomer resin may be used for forming the outsert-molded resin part 12 according to usage of the LCD device. Adopting of an elastomer resin would enable sealing off a space between the touchscreen panel 2 and the LCD panel 3, from the air, without using a sealing element other than the outsert-molded resin part 12.

In the present embodiment, outer ends of the outsert-molded resin part 12 come outside of edge faces of the touch-screen panel 2 so that all-around outer fringe of the outsert-molded resin part 12 sticks out from the touchscreen panel 2. From certain portions of such all-around outer fringe, positioning ribs 13 are protruded as raised to obverse or to a side of a viewer. Each of the positioning ribs 13 runs along outline of the outsert-molded resin part 12 and abuts on an edge face of the touchscreen panel 2. By this way, positioning of the touchscreen panel 2 is made. In an example illustrated in FIG. 3, each of the positioning ribs 13 is arranged to be distanced from corners of the bezel cover 1. And, among the positioning ribs 13, four of them are arranged on each long side of a rectangle of the bezel cover 1, and two of them are arranged on each short side of the rectangle. At a time of assembling, the touchscreen panel 2 is brought on the bezel cover 1, by pressing forcefully from obverse for example, to be clamped by the positioning ribs 13 and positioned as predetermined. By way of the positioning ribs 13, assembling of the touchscreen panel 2 onto the bezel cover 1 is swiftly made in a labor saving manner and, in same time, with high precision of positioning. Moreover, because the positioning ribs 13 are protruded in a direction in which the wall 1A of the bezel cover 1 extends vertically or in thickness wise, the outsert molding does not require a complex set of forming tools and/or process steps for lateral eviction or the like. For forming the positioning ribs 13, it is merely required that; the upper and lower forming tools make a vertical motion for opening and closing the forming tools. Thus, low production cost and production efficiency of the outsert molding would not be affected.

The metal sheet used for forming the metal frame 11 may be a zinc-plated steel plate such as SECC (Steel, Electrogalvanized, Cold Rolled, Coil) or other plated steel sheet or coil. If required, a stainless steel sheet or a magnesium alloy sheet may be used. The metal frame 11 may be easily produced by mere following process. A metal sheet is subjected to punching for forming an opening for the viewing area and for forming engagement holes 14 to be explained later, and then to drawing for bending each portion to have an L-shaped cross section. As shown in FIG. 3, in a detailed example, the thickness-wise wall 1A of the bezel cover 1 has engagement holes 14, at positions matching those of the positioning ribs 13. And, into each of the engagement holes 14, respective one of the engagement projections 44 of the back light unit 4 is fitted. In an illustrated example, each of the engagement projections 44 is a terrace-shaped projection formed on metal casing 41 of the backlight unit 4, by drawing or other sheet-metal working. On the metal casing 41, positioning tabs 45 are also provided for engaging with edge faces of the LCD panel 2. In the illustrated example, each of the positioning tabs 45 may be shaped in a following way. Punching is made at a portion of a side wall of the metal casing 41, along an angled-C-shaped line that starts and ends at a obverse end of the side wall. Then, thus-formed tab portion is turned toward obverse or frontward by bending at its basal portion. Two of the positioning tabs 45 are arranged along each of three sides of a rectangle of the LCD panel 2. The positioning tabs 45 are omitted at a long side of the rectangle, at which the LCD panel 2 is connected with an FPC (flexible printed circuit board) 34. The FPC 34 is for driving and inputting to driver IC chips 35 that are mounted on a peripheral connection part of the LCD panel 3.

In a detailed example in respect of dimensions of the bezel cover 1, wall thickness of the metal frame 11 is in a range of 0.3-0.5 mm and is 0.4 mm for example; and thickness of the outsert-molded resin part 12 is in a range of 0.7-1.2 mm and is 0.9 mm for example. Width of the positioning rib 13 may be set as equal to that of thickness of the outsert-molded resin part 12; and protrusion or raised dimension of the positioning rib 13 may be set as equal to thickness of the touchscreen panel 2, particularly in a range of 1.3-1.99 mm, and at 1.6 mm for example. Thickness of the inner-fringe part 16 of the outsert-molded resin part 12 may be set in a dimension that is a sum of the above-mentioned thickness of the outsert-molded resin part 12 and the above-mentioned thickness of the metal frame 11; and may thereby be set at 1.3 mm for example. Nevertheless, the Thickness of the inner fringe part 16, especially at its inner portion, maybe set smaller than the above, so as to curb applying of pressing force on the viewing area 32 of the LCD panel 2 even at a time strong pressing down is made on the touchscreen panel 2 by the user. In this way, damaging of display quality will be curbed. For example, the thickness of the inner fringe part 16, except for its basal or proximal portion, may be set as equal to other part of the outsert-molded resin part 12.

A reflective LCD panel may also be used in same manner as above while transmissive one or semi-transmissive one is used in the embodiment and examples explained hereto. For obtaining black resin compound for the outsert molding, black dye might be used in place of the black pigments in the above embodiment. By use of black dye, black coloring might possibly be made even after the outsert molding process. While explanation on detailed construction of the LCD panel is omitted, any kind of LCD panel may be used so long as that is for matrix display. An amorphous silicone or polysilicone TFT is arranged on each of a pixel dot in general construction, while other construction may be adopted for the LCD panel. In place of the LCD panel, OLED (Organic light-emitting diode; or Organic Electro-Luminescence) panel or other self-luminous display panel may be used in same manner as the above.

Figure 4:
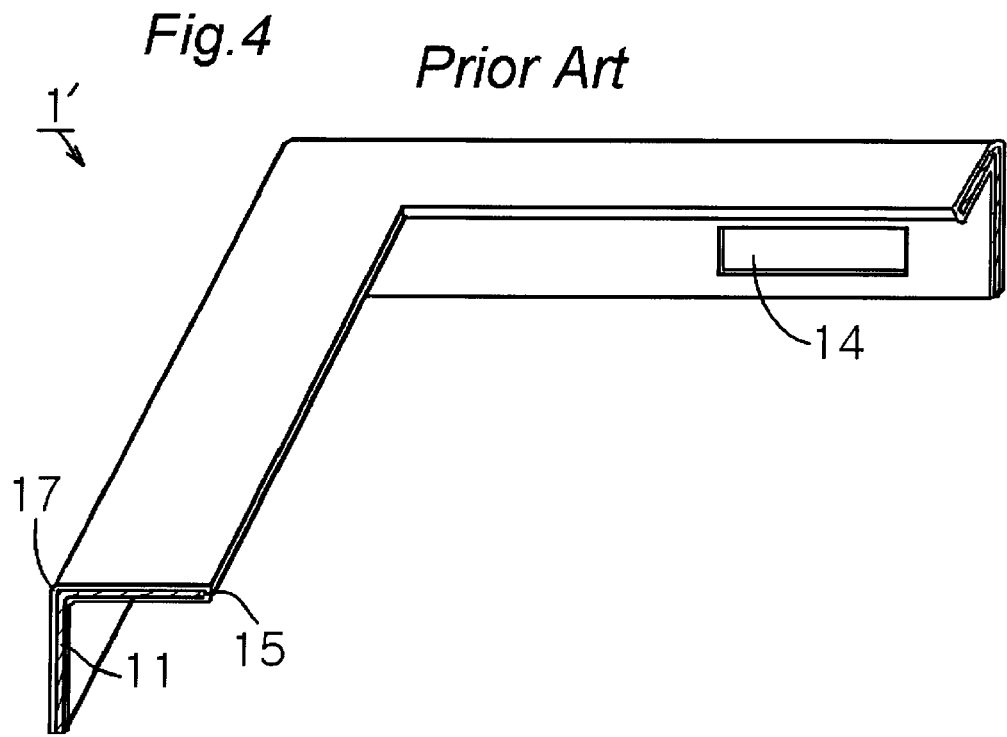
FIG. 4 is a cross-sectional perspective view showing a bezel cover according to a comparative example of an LCD device.

In below, a comparative example will be explained by use of FIG. 4. Here, a bezel cover 1' has a black coating film 17 that is formed by electrodeposition coating and covers up whole surface of the metal frame 11 having the L-shaped cross section. In a process of the electrodeposition coating, an operator have to pay a special attention to ensure that inner fringe 15, at its edge face in particular, of the metal frame 11 is completely and surely covered with the black coating film 17. Except for replacing of the outsert-molded resin part 12 with the black coating film 17, the LCD device of the comparative example is exactly same with that of the detailed example illustrated in FIGS. 1-3 and explained in the above. Production cost of the bezel cover 1' of the comparative example is higher by 20% than that of the detailed example in the above, in which black layer is reliably formed by a single process of the outsert molding. Reason for this is that the production cost for the comparative example includes all of; costs for electrodeposition coating equipments and their operation, and cost for paint or coating composition; as well as costs for re-doing of the electrodeposition coating at occasions that faulty coating is occurred due to adhering of foreign particles or smear on the metal element. Whereas electrostatic coating with mist or powder of coating composition may be adopted in place of the electrodeposition coating, the cost for coating process would be similarly high.

What is claimed is:
1. A flat-panel display device, comprising:
 a display panel, a main surface of which is substantially a viewing area;
 a bezel cover formed of a metal frame, the bezel cover having an L-shaped cross section and an inward flange and covering a fringe part of the display panel;
 a touchscreen panel that is arranged to cover the viewing area of the display panel so that the inward flange of the bezel cover is sandwiched between the fringe part of the display panel and a fringe part of the touchscreen panel; and an outsert-molded resin part that is formed integrally on said metal frame, by outsert molding with a black resin material, the outsert-molded resin part completely covering a fringe surface of the inward flange of the bezel cover and covering at least a portion of an obverse face of the inward flange of the bezel cover, the obverse face facing the touchscreen panel.

2. The flat-panel display device according to claim 1, further comprising:

an outer fringe of the outsert-molded resin part, which comprises an outer fringe portion protruding outside edge faces of the touchscreen panel; and ribs that are raised from respective portions of said outer fringe and formed on the inward flange of the bezel cover, the ribs running along and abutting on the edge faces of the touchscreen panel so that the touchscreen panel is positioned by the ribs.

3. A manufacturing method of a flat-panel display device that is comprised of:

a display panel, a main surface of which is substantially a viewing area;

a bezel cover formed of a metal frame, the bezel cover having an L-shaped cross section and an inward flange and covering a fringe part of the display panel; and a touchscreen panel that is arranged to cover the viewing area of the display panel so that the inward flange of the bezel cover is sandwiched between the fringe part of the display panel and a fringe part of the touchscreen panel;

the method comprising: forming the bezel cover by a metal-sheet working, from a metal sheet having no resin coating layer; and outsert molding, in which the bezel cover is positioned in a forming tool and then a black resin material in a molten state is introduced into the forming tool so as to form a black resin part that completely covers a fringe surface of the inward flange of the bezel cover and covers at least a portion of an obverse face of the inward flange of the bezel cover, the obverse face facing the touchscreen panel.

4. The manufacturing method of a flat-panel display device according to claim 3, wherein at a time of the outsert-molding, ribs raised from outer fringe portions of said black resin part are formed simultaneously with said black resin part; and, when assembled, said ribs run along and abut on edge faces of the touchscreen panel so that the touchscreen panel is positioned by the ribs.

5. The flat-panel display device according to claim 1, wherein the outsert-molded resin part forms a resin flange protruding from the fringe surface of the inward flange of the bezel cover toward the viewing area.

6. The flat-panel display device according to claim 5, wherein a width of the resin flange in the protrusion dimension is about 0.5-4 mm.

7. The manufacturing method according to claim 3, wherein the black resin part forms a resin flange protruding from the fringe surface of the inward flange of the bezel cover toward the viewing area.

8. The manufacturing method according to claim 7, wherein a width of the resin flange in the protrusion dimension is about 0.5-4 mm.

* * * * *